June 5, 1928.

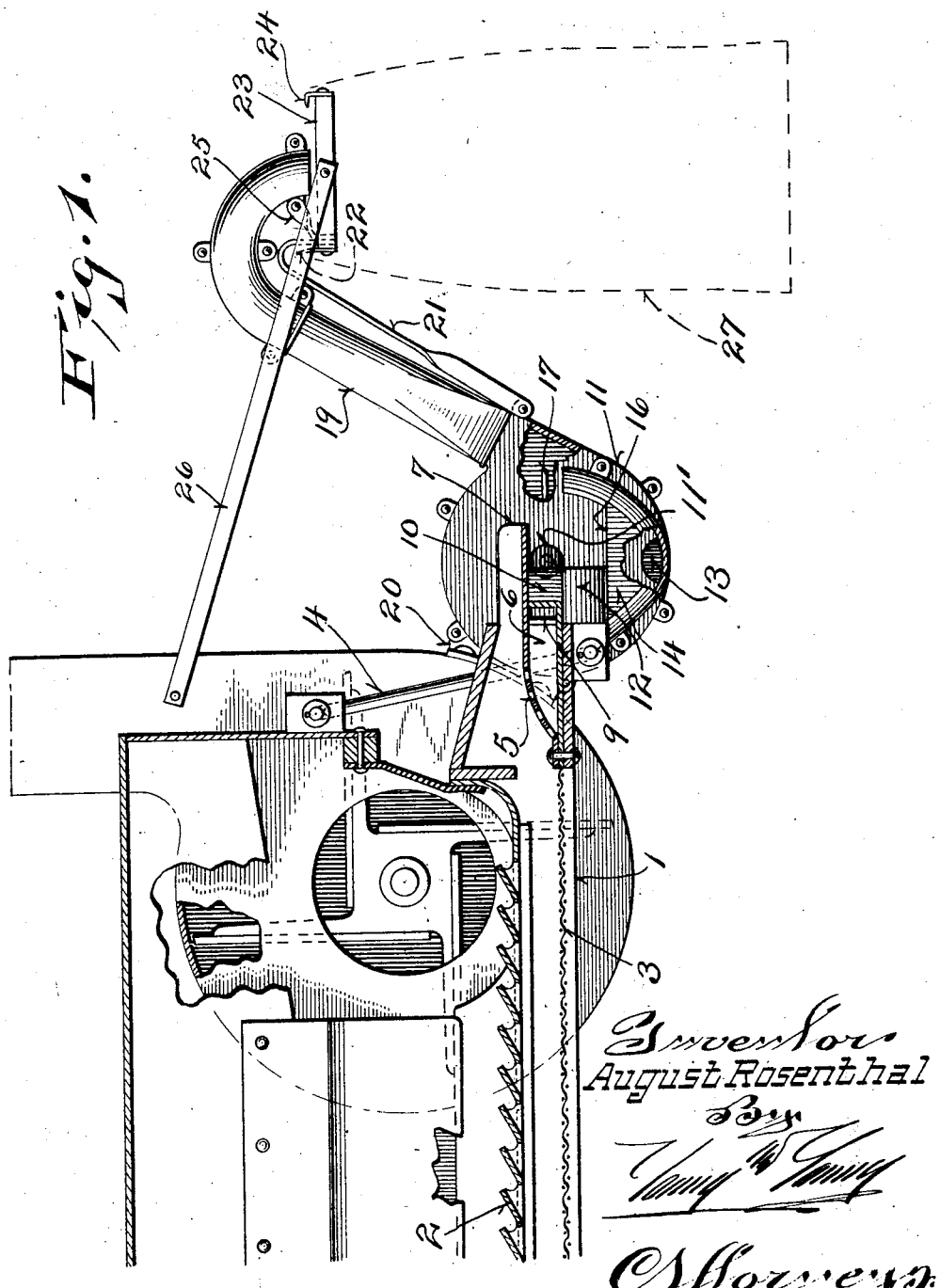

A. ROSENTHAL

CORN HUSKER

Filed Feb. 23, 1928

Inventor
August P. Rosenthal

Patented June 5, 1928.

1,672,501

UNITED STATES PATENT OFFICE.

AUGUST ROSENTHAL, OF WEST ALLIS, WISCONSIN, ASSIGNOR TO ROSENTHAL MFG. COMPANY, OF WEST ALLIS, WISCONSIN.

CORN HUSKER.

Application filed February 23, 1928. Serial No. 256,340.

This invention relates to corn huskers, and is particularly directed to a bagger blower construction.

Objects of this invention are to provide a form of corn husker in which a novel form of blower is provided and cooperates with the corn husker in a manner to permit the ready discharge of the shelled kernels into the blower, and to insure the discharge of the kernels from the blower into a bag without any breaking or cracking of the kernels as has heretofore usually occurred with bagger blowers.

Further objects are to provide a novel form of blower which has the corn inlet opening so arranged that there is no danger of striking the blades against the entering corn, but instead in which the corn grains are entrained by the blast of air and carried upwardly through the discharge support and discharged into the bag without any contact with the rapidly revolving blades of the bagger blower.

Further objects are to provide a novel form of blower for a corn husker which permits shaking of the trough without transmitting any shaking motion to the blower, and which is so constructed that all of the grains discharged from the shaker trough are received by the blower, and in which provision is made for preventing bouncing outwardly of the grains of corn from the blower, although a relatively large amount may be suddenly discharged into the blower.

Further objects are to provide a very simple and eminently practical construction which may be very cheaply manufactured and which is adapted to cooperate with corn huskers without requiring modification of the corn husker.

An embodiment of the invention is shown in the accompanying drawings in which:

Figure 1 is a sectional view through a corn husker showing the blower in place with parts broken away, such view corresponding to a section on the line 1—1 of Figure 2;

Figure 3:
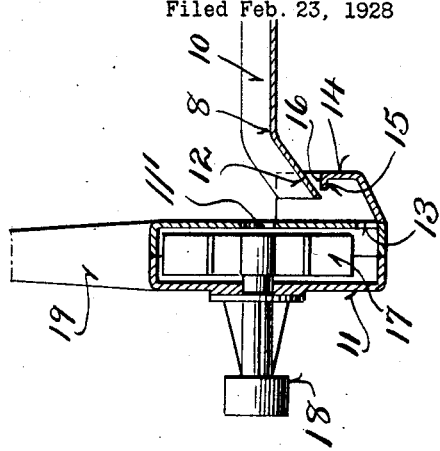
Figure 3 is a vertical sectional view approximately on the line 3—3 of Figure 2.

Referring to the drawings, it will be seen that a corn husker of the type described in my prior Patent No. 1,629,930 of May 24, 1927 for a shaker trough for corn huskers, has been disclosed.

Figure 2:
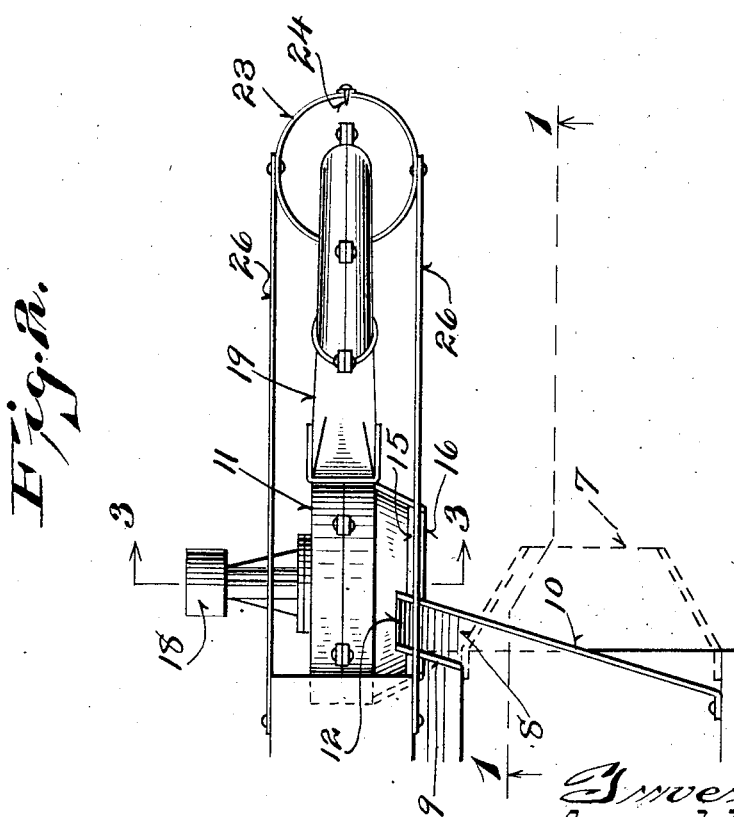
Figure 2 is a fragmentary plan view of a portion of the structure shown in Figure 1 with parts thereof removed.

This corn husker is provided with a shaker trough having side bars 1 which carry a main bottom 2 and a screen bottom 3 spaced below the main bottom. The main bottom 2 is provided, as shown, with upwardly struck projections and adjacent openings, so that the grains of corn inadvertently shelled by the husker may pass through the openings in the main bottom 2 and may rest temporarily upon the screen bottom 3. This shaker trough is constantly in motion back and forth when the machine is running, as described in my prior patent and is carried by means of links 4 so that it has a swinging shaking motion. Any dirt or dust that may be discharged with the grains of corn passes through the screen 3 and drops from the machine. The grains of corn and any other small material that may be discharged therewith are finally passed outwardly through the head of the shaker trough and over the apertured intermediate partition 5. The grains of corn, however, in passing over the intermediate partition 5 will fall through the apertures thereof into the trough-like space 6. Any small cut material that may be carried with the grains of corn will pass over the intermediate partition and be discharged through the upper trough-like portion 7 (see Figures 1 and 2).

It is to be noted that the bottom of the head portion of the trough is provided with a laterally and slightly forwardly projecting discharge trough 8 (see Figure 2) which is formed by means of the guide members 9 and 10. The guide member 10 extends across the bottom of the main shaker trough, as shown most clearly in Figure 2. Thus, the separate grains of corn pass outwardly through the trough-like portion 8, and are carried to the bagger blower whose casing is indicated by the reference character 11 in each of the views. This casing is formed in two parts, as shown, and the parts may be bolted or otherwise secured together, as indicated particularly in Figure 3. It is to be noted that the trough-like member 8 is provided with a downwardly extending portion 12 which passes downwardly, preferably on the inner side of the casing of the blower.

As best shown in Figure 1, the casing 11 is provided with a central air inlet opening 11', and in addition thereto a second aperture 13 through which kernels of corn enter the casing, as will be hereinafter described. Particular attention is directed to the ratios of the areas of the openings 11' and 13 to one another, and to the blower exhaust opening.

In practice it was found most desirable to introduce the kernels of corn into the casing, at a point out of the path of travel of the fan blades, in order to prevent breaking of the kernels resulting from contact with the blades. Because of the foregoing, the aperture 13 necessarily breaks or reduces the suction of the blower. Therefore, it was found that the central air inlet had to be reduced in area to approximately one-half of the area of the aperture 13, in order to insure the proper supply of air to maintain the necessary suction for drawing the kernels into the casing and forcing them through the blower exhaust, the area of which is approximately equal to that of the aperture 13. These ratios result in maintaining the maximum suction so divided between the two openings as not to interfere with the force of the blower, and at the same time efficiently draw in the kernels delivered to the blower casing.

The blower is provided with an outwardly and upwardly extending lip 14, which has a horizontal upper edge, as shown in Figures 1 and 3, and is provided with an inturned flange 15, (see Figure 3) thus forming a pocket to receive and prevent any grains of corn delivered thereto from bouncing outwardly. It is to be noted particularly that the casing 14 is provided with a semi-circular body portion having an intermediate wall 16, as shown in Figure 1. Thus, although the shaker trough may be violently shaken back and forth, nevertheless the portion 12 will overhang the auxiliary lip 14, and, consequently, the corn kernels will be discharged into the same, irrespective of the position occupied by the shaker trough.

The fan 17 of the bagger blower is carried by a horizontal shaft equipped with a driving pulley 18. The blades of this fan are spaced upwardly from the bottom portion of the casing 11 of the blower, as shown in Figure 3, and, consequently, corn entering the blower casing through the aperture 13 will be positioned below the reach of the blades. However, this entering corn will be entrained by the rapidly entering and traveling air and will pass outwardly through the discharge spout or pipe 19. Preferably also the casing 11 is secured to a rigid portion of the corn husker, as indicated by the reference character 20 in Figure 1. It is to be noted that this auxiliary blower casing is provided with an upwardly and outwardly extending brace piece 21 which is equipped with an upturned hook 22, as shown in Figure 1. This upturned hook is riveted together with the brace 21 to a bag receiving ring 23. This ring, it will be noted, is also provided with one or more inwardly projecting prongs 24 on its outer side. It is to be noted also that the ring 23 is rigidly held to the discharge spout or pipe 19 not only by the brace 21, but by a link 25 (see Figure 1) which is secured both to the spout and to the ring.

In addition to this, a pair of supporting strap members 26 are attached to a rigid portion of the framework of the corn husker at one of their ends, and at the other ends thereof are attached to the ring 23.

When the device is in use, it will be readily seen that the corn grains which drop upon the main bottom 2 of the corn husker will pass therethrough and the dirt or dust carried by the grains will be discharged through the wire screen 3 (see Figure 1). Further than this, due to the motion of the shaker trough, the grains will progress to the right of the apparatus, as viewed in Figure 1 and will discharge along the chute 8 into the corn receiving casing of the blower. The rapid and violent suction produced by the blower will insure the withdrawing thereinto of the grains of corn fed from the corn husker.

Further than this, from a consideration of Figure 3, it is readily apparent that any bouncing of the grains of corn will be stopped by the inturned lip 15 of the corn receiving auxiliary casing of the bagger blower and, consequently, the grains of corn can not bound therefrom. Further, the auxiliary casing 14 slopes downwardly from opposite sides and from its outer side towards the opening 13 of the main casing of the auxiliary blower. In addition to this, it is to be noted that the blades of the fan or rotor 17 of the blower are always spaced upwardly a material distance from the entering corn and, consequently, will not strike the corn grains with consequent breaking thereof, but will insure the discharge of the grains through the discharge chute or pipe 17 into the receiving sack 27.

In regard to the positioning of the sack upon the ring 23, it is to be noted that the inner edge of the mouth of the sack is hooked over the upstanding prong 22 and the outer edge of the mouth is hooked over the inwardly extending prong 24. This insures an easy positioning and a secure retention of the sack in correct position upon the ring.

It is to be noted that the auxiliary casing 14 of the blower is bolted to the main casing of the blower and consequently may be formed separately therefrom, if desired.

It will be seen, therefore, that a very effective type of bagger blower has been provided which will cooperate with the shaker troughs of the corn huskers in a manner to prevent spilling of the corn grains as they pass from the shaker trough to the stationary blower casing.

It will be seen further that there is no possibility of the breaking of the grains of corn by the bagger blower.

Although the invention has been described in considerable detail, such description is intended as illustrative rather than limiting as the invention may be variously embodied and as the scope of such invention is to be determined as claimed.

I claim:

1. The combination of a corn husking machine having a shaker trough provided with a discharge head, a blower having a casing located adjacent the discharge head and having an auxiliary casing adapted to receive corn from the discharge head of the shaker trough irrespective of the position of the shaker trough, said auxiliary casing extending outwardly from the main casing of the blower and said shaker trough having a projecting portion adapted to guide the corn into the auxiliary casing of the blower.

2. The combination of a corn husker having a shaker trough adapted to receive grains of corn, said shaker trough having a screen bottom and having a discharge head provided with an intermediate partition apertured to permit the passage therethrough of grains of corn, a trough-like projecting portion located below said intermediate partition and extending laterally and downwardly of the shaker trough, a bagger blower carried by the corn husker and having a receiving compartment provided with a horizontal upper edge overhung by said laterally projecting trough-like portion.

3. A blower for cooperation with a corn husker and adapted to receive grains of corn, said blower having a main casing, a rotor mounted therein, a discharge pipe projecting from said main casing, said main casing having an aperture located adjacent its periphery and extending through one side wall of the casing, and an auxiliary casing secured to said main casing and extending outwardly therefrom, said auxiliary casing slanting downwardly towards said inlet opening.

4. A blower for grains of corn comprising a split casing of generally circular contour, a rotor housed therein and having projecting blades, said main casing having a discharge pipe extending tangentially therefrom and having an inlet opening adjacent its lower portion and extending through one side wall thereof, said inlet opening communicating with the space below the blades of said rotor, an auxiliary casing secured to said main casing and spaced outwardly therefrom to form a receiving pocket converging downwardly to said opening, whereby corn fed into said auxiliary casing will fall downwardly to said inlet opening and will be entrained by the blast of air created by said rotor without contacting with the blades of said rotor.

5. The combination of a corn husker having a stationary casing and having a rocking shaker trough, said shaker trough having a discharge portion for grains of corn provided with a laterally and downwardly extending chute, a bagger blower secured to the stationary casing of said corn husker and having a main casing enclosing a rotor, said rotor being spaced upwardly from the bottom edge of said main casing, one side wall of said main casing having an entrance aperture adjacent its bottom portion and below the blades of said rotor, an auxiliary casing secured to the main casing of said blower and forming an outwardly spaced pocket below the laterally extending chute of said shaker trough and communicating with said opening, said blower casing having a tangentially projecting discharge pipe and a bag retaining ring supported from the casing of said corn husker and from said blower casing and positioned adjacent the discharge end of said pipe.

6. The combination of a corn husking machine having a shaker trough provided with a discharge head, a blower having a casing located adjacent the discharge head and having a pocket for receiving corn from the discharge head of the shaker trough irrespective of the position of said trough, said casing being provided with an aperture out of the path of travel of the fan for receiving kernels of corn delivered thereto.

7. The combination of a corn husking machine having a shaker trough provided with a discharge head, and a blower having a casing located adjacent the discharge head, said casing being provided with an aperture out of the path of travel of the fan for receiving kernels of corn from the discharge head of said trough.

8. The combination of a corn husking machine having a shaker trough provided with a discharge head, and a blower having a casing located adjacent the discharge head for receiving kernels of corn therefrom, said casing having an air inlet and an aperture, the latter for receiving kernels of corn delivered to the blower, said inlet being of lesser area than the area of said aperture.

9. The combination of a corn husking machine having a shaker trough provided with a discharge head, and a blower having a casing located adjacent the discharge head for receiving kernels of corn therefrom, said casing having an air inlet and an aperture, the latter for receiving kernels of corn delivered to the blower, said inlet being approximately one-half the area of said aperture.

10. The combination of a corn husking machine having a shaker trough provided with a discharge head, and a blower having a casing located adjacent the discharge head for receiving kernels of corn therefrom, said casing having an air inlet and an aperture, the latter for receiving kernels of corn delivered to the blower, the combined areas of said inlet and aperture being greater than that of the blower exhaust.

11. The combination of a corn husking machine having a shaker trough provided with a discharge head, and a blower having a casing located adjacent the discharge head for receiving kernels of corn therefrom, said casing having an air inlet and an aperture, the latter for receiving kernels of corn delivered to the blower, the combined areas of said inlet and aperture being one and one-half that of the blower exhaust.

12. The combination of a corn husker having a shaker trough provided with a discharge head, and a blower having a casing located adjacent the discharge head and having a pocket for receiving corn from said discharge head, said casing being provided with a central air inlet, and an aperture out of the path of travel of the fan for receiving kernels of corn delivered thereto.

In testimony that I claim the foregoing I have hereunto set my hand.

AUGUST ROSENTHAL.